March 23, 1948.  C. F. KANTOLA  2,438,397
LOCOMOTIVE TENDER AND WATER SCOOP
Filed July 6, 1944  7 Sheets-Sheet 1
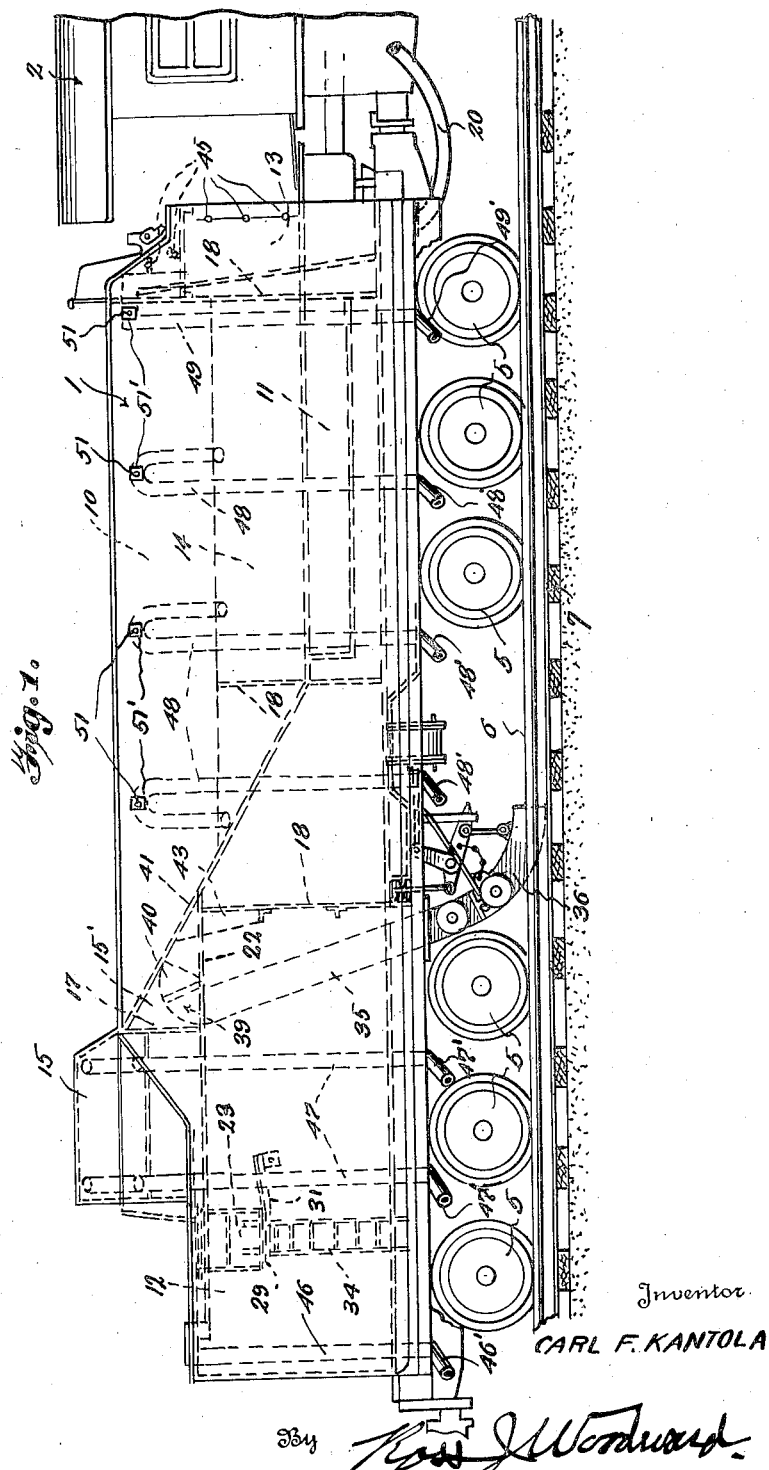
Fig. 1.
Inventor
CARL F. KANTOLA
By 
Attorney

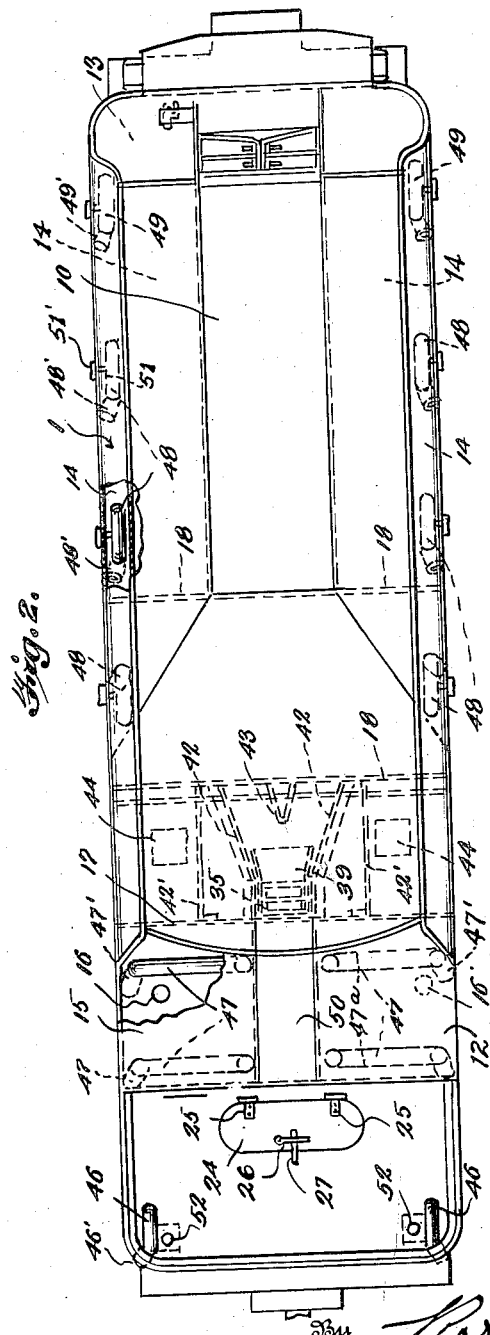

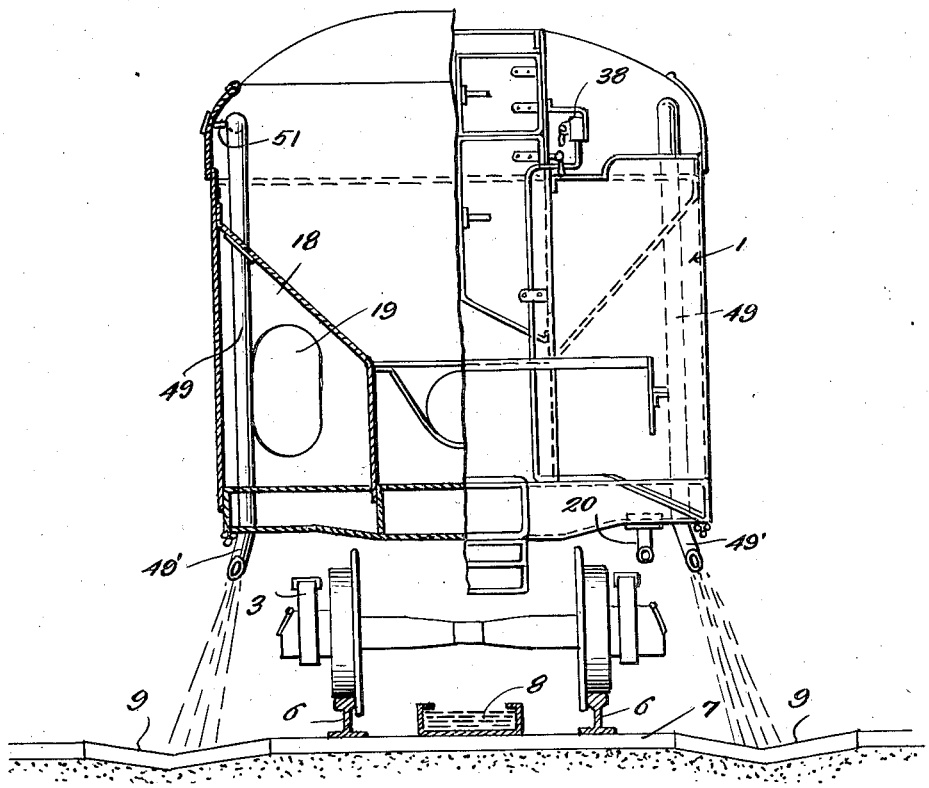
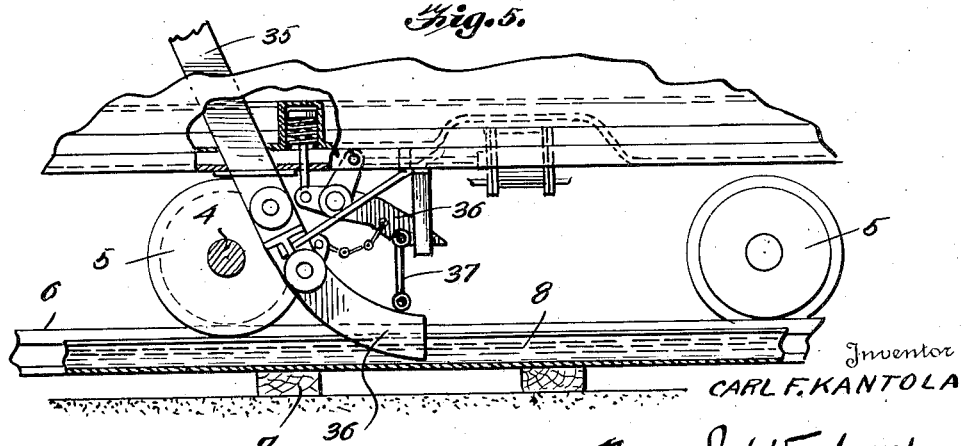

March 23, 1948.     C. F. KANTOLA     2,438,397
LOCOMOTIVE TENDER AND WATER SCOOP
Filed July 6, 1944     7 Sheets-Sheet 4
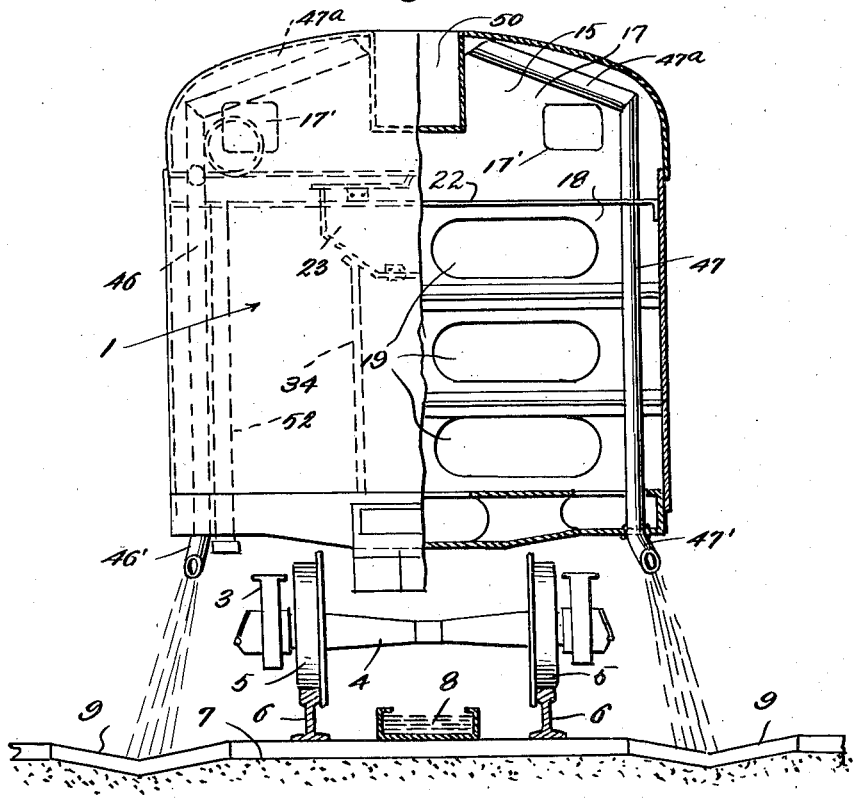
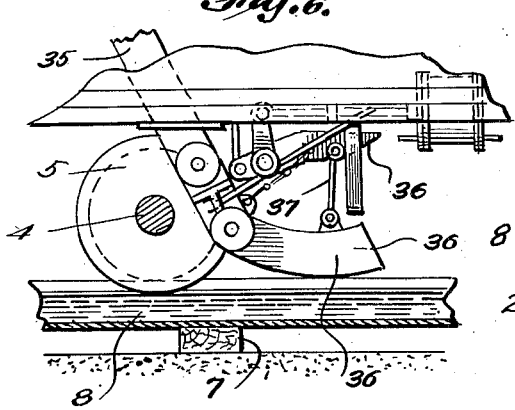
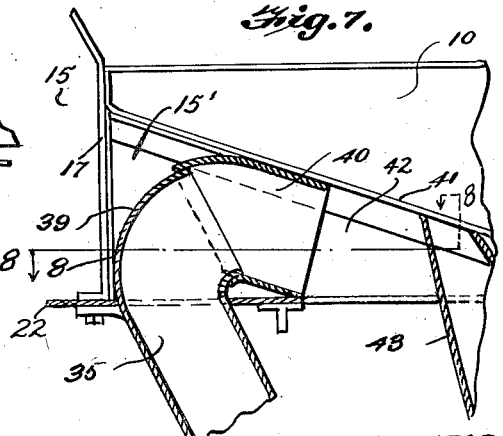
INVENTOR
CARL F. KANTOLA
ATTORNEY March 23, 1948.   C. F. KANTOLA   2,438,397
LOCOMOTIVE TENDER AND WATER SCOOP
Filed July 6, 1944   7 Sheets-Sheet 5

INVENTOR
CARL F. KANTOLA
BY
ATTORNEY.

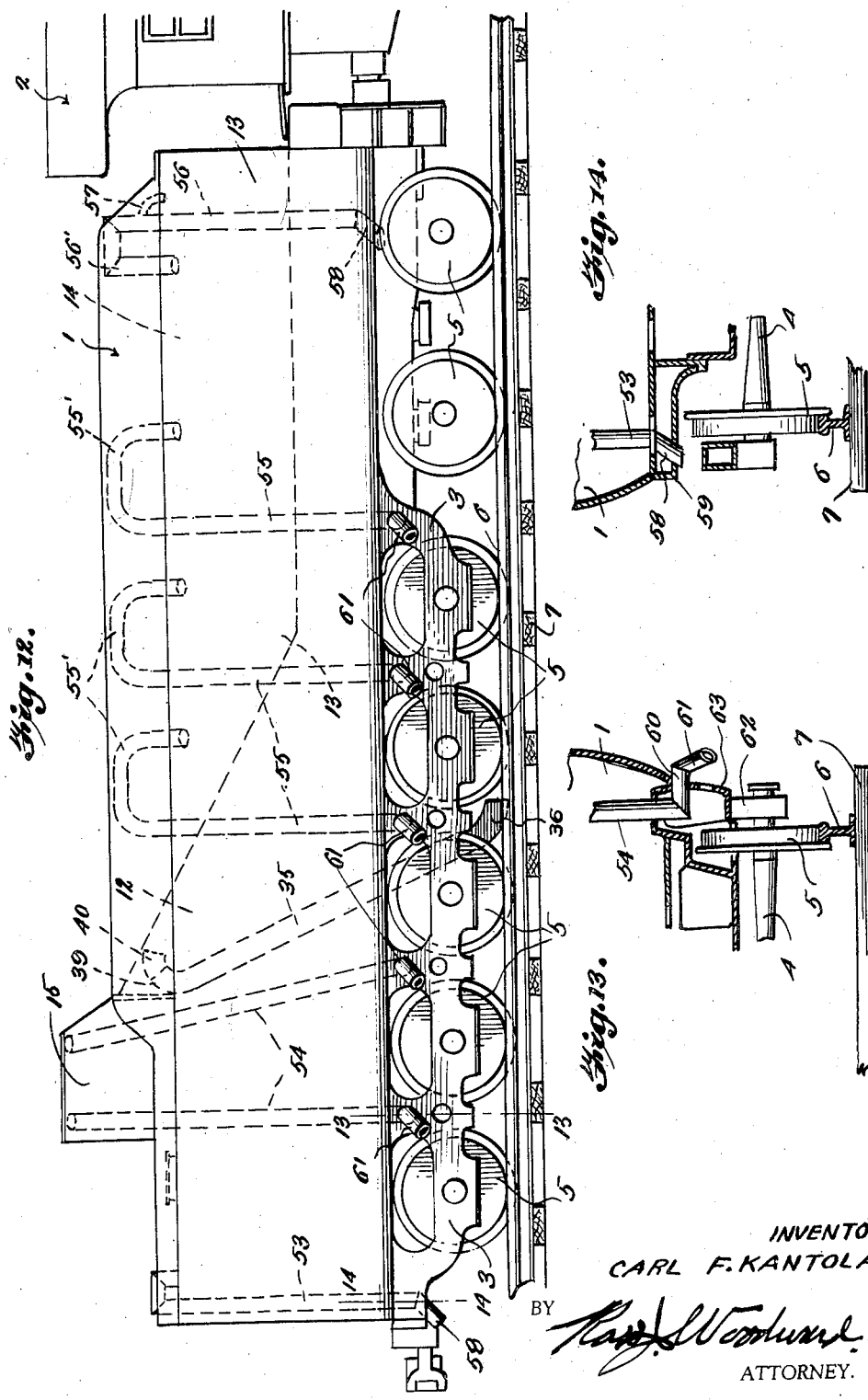

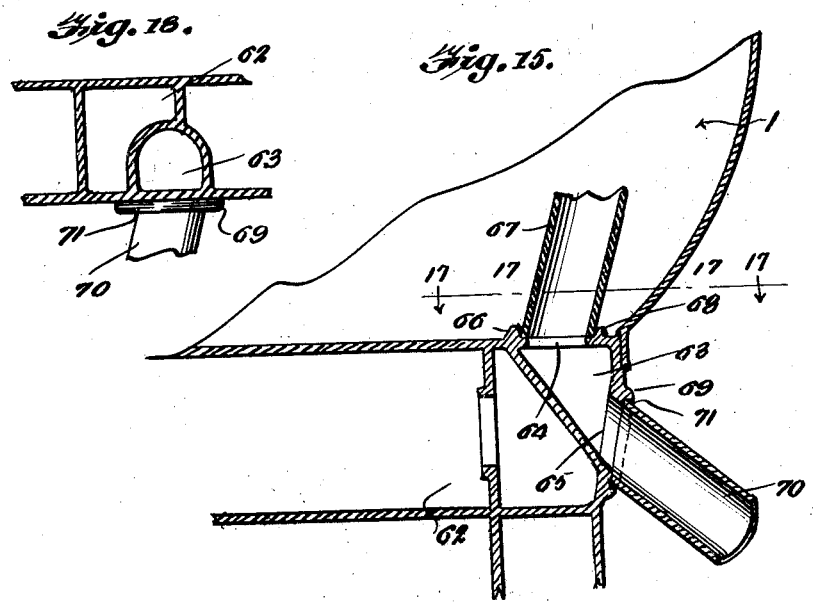

Patented Mar. 23, 1948

2,438,397

UNITED STATES PATENT OFFICE 2,438,397

LOCOMOTIVE TENDER AND WATER SCOOP

Carl F. Kantola, Dumont, N. J.

Application July 6, 1944, Serial No. 543,709

10 Claims. (Cl. 105—236)

This invention relates to a tender for a locomotive engine and more particularly to the water compartment thereof and mechanism for filling the compartment with water from a track pan and controlling overflow of water from the water compartment.

One object of the invention is to provide the tender with water scooping mechanism so constructed that water may be taken from a track pan while the train is moving at high speed, thus eliminating necessity for and loss of time encountered in filling the tank from an overhead water column or slowing the train while filling the tank from a track pan and thereby saving a great deal of time in operating schedules.

Another object of the invention is to so form the tender and the scoop that, as water is forced through the scoop and into the tank under high pressure of a fast-moving train, the water will be prevented from damaging the tank or other portions of the tender and also prevented from overflowing and being blown rearwardly through vents or through an open top filling inlet into an open door of a mail car or against windows or into open windows of passenger cars of the same or other trains.

Another object of the invention is to provide a construction wherein the incoming water flowing from the upper end of the scoop will be divided and spread in such a manner that its force will be reduced and damage by water under high pressure eliminated.

Another object of the invention is to provide a tender wherein water overflowing from the tank of the tender will be directed downwardly and discharged at the bottom of the tender into troughs at opposite sides of a track. Therefore, formation of ice upon the top and sides of the tender will be prevented.

Another object of the invention is to provide the tender with a neck or funnel extending downwardly about the opening through which water may enter the tank from the pipe or spout of an overhead tank, the lower end of the funnel being normally closed by a trapdoor which operates as a check valve opening under the pressure of the water when it is taken from a water column, but held closed under the water and air pressure inside the tank when scooping to seal the inlet against escape of air and water through said inlet and to allow of the building up of the air pressure to assist in distributing the water to the water spaces or compartments of the tender.

Another object of the invention is to provide a tender with an improved arrangement of surge tanks and overflow pipes which may be built into a tender having a conventional arrangement of fuel space and water compartments and thus allow a tender of conventional construction to be converted into a tender of the improved construction.

In the accompanying drawings:

Fig. 1 is a side elevation of the improved tender.

Fig. 2 is a top plan view of the tender.

Fig. 3 is a view looking at the front end of the tender with a portion thereof in vertical section.

Fig. 4 is a view looking at the rear end of the tender with a portion in vertical section.

Fig. 5 is a fragmentary view showing the water scoop lowered and entering the water pan or trough of the track.

Fig. 6 is a view similar to Fig. 5, showing the scoop raised.

Fig. 7 is a fragmentary sectional view showing the upper portion of the water scoop pipe and adjacent portions of the tender.

Fig. 12 is a side elevation of a modified embodiment of the invention.

Fig. 13 is a fragmentary sectional view on the line 13—13 of Fig. 12.

Fig. 14 is a sectional view on the line 14—14 of Fig. 12.

Fig. 15 is a fragmentary sectional view taken vertically through another modified construction.

Fig. 16 is a fragmentary view looking at a side of Fig. 15.

Fig. 17 is a fragmentary view on the line 17—17 of Fig. 15.

Fig. 18 is a sectional view on the line 18—18 of Fig. 16.

Figure 8:
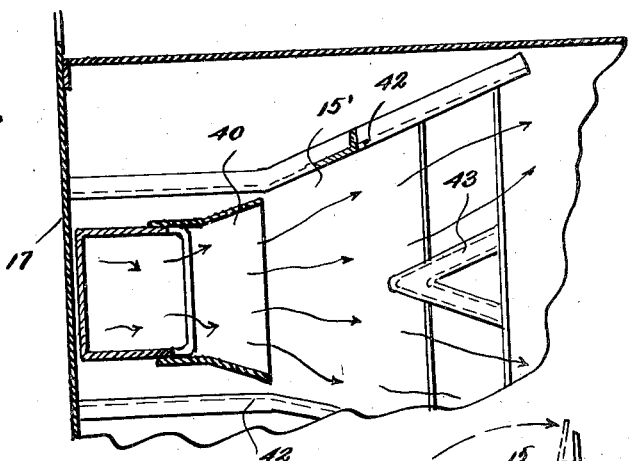
Fig. 8 is a fragmentary sectional view on the line 8—8 of Fig. 7.
Figure 9:
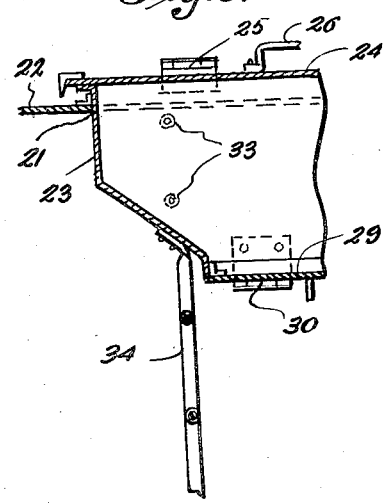
Fig. 9 is a fragmentary sectional view taken vertically through an inlet provided at the top of the water space of the tender to accommodate a spout of an overhead tank at a station.
Figure 10:
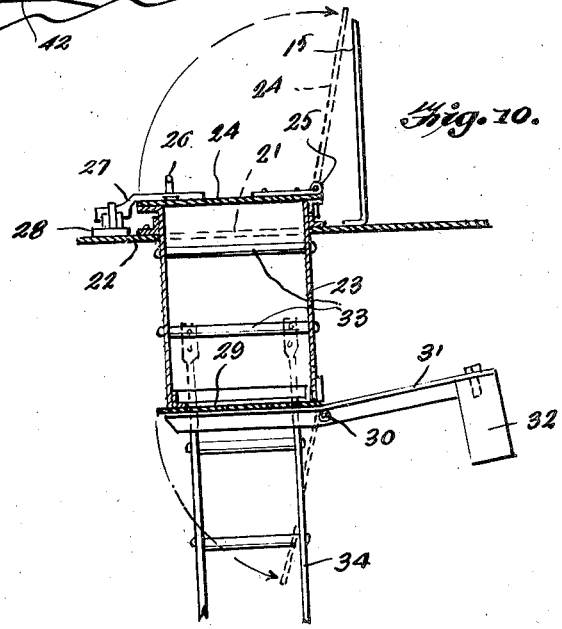
Fig. 10 is a vertical sectional view taken at right angles to Fig. 9.
Figure 11:
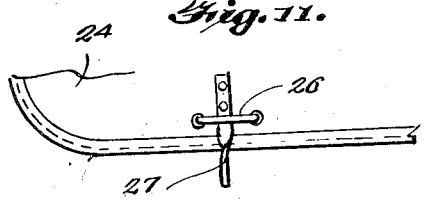
Fig. 11 is a view looking down on the cover for the upper filler opening of Figs. 9 and 10.

In the accompanying drawings, the tender, which is indicated in general by the numeral 1, is shown coupled to an engine 2 and is equipped with the usual trucks 3 carrying axles 4 and wheels 5 for resting upon and rolling along the rails 6 of a track 7. A scoop pan 8 extends longitudinally of the track between the rails and, at opposite sides of the track are gutters 9 for catching water which may overflow when the tender is filled with water scooped from the pan 8.

The tender has the usual fuel space 10 and conveyor compartment 11, from which fuel is delivered to the firebox of the locomotive. The tender also has a rear water compartment 12 and a front water compartment or tank 13, which compartments are connected with each other by side tanks or compartments 14. Over the rear water compartment and back of the fuel space 10 is an expansion tank 15 which has communication with the rear tank through drain openings 16 and has its forward portion 15', which is of gradually reduced height, set off from its main portion by vertically disposed transversely extending plates 17 having openings 17' therein so that water may flow in the expansion tank longitudinally of the tender. Bulkheads 18 are provided in the rear tank and the side tanks to check surge of water longitudinally of the tender, but are formed with openings 19 in order that water may flow from one tank to another and maintain an even level in the tanks. The usual pipe 20 is provided for delivering water from the tender to the boiler of the locomotive engine.

A filling opening 21 is formed through the top wall 22 so that the water compartments or tanks may be filled from an overhead tank at a station along the track by a spout thrust inwardly through the filling opening. Through this filling opening passes a funnel 23 which tapers downwardly to a small outlet at its lower end and has its upper portion projecting upwardly through the filling opening 21 and normally closed by a cover 24. This cover is hinged at its front end by hinges 25 so that it may be swung upwardly to open position and, at its free rear edge, carries a handle 26 for swinging the cover to raised position and a latch 27 for engaging a keeper 28 and securing the cover closed. The reduced opening at the lower end of the funnel is normally closed by a gate 29 having a hinge mounting 30 at its front edge so that it may swing vertically from raised or closed position against the lower end of the funnel, to lowered or open position. A bar or arm 31 extends from the hinged end of the gate and carries a weight 32 which urges the gate upwardly and normally holds it closed. When a filling spout of an overhead tank is thrust into the funnel through the upper end thereof, the force of water flowing from the spout will open the gate and, when the spout is withdrawn, the weight will return the gate to its closed position. The funnel also serves as a manhole through which a workman may enter the water chamber 12 for inspecting, cleaning, or repairing the same, and, in order that the workman may readily descend and climb out of the water chamber, there has been provided rungs 33 in the funnel and a ladder 34 which is attached to and extends downwardly from the funnel at a side thereof. It will thus be seen that the water chambers of the tender may be filled from an overhead tank of the type commonly provided at stations along a railway track.

In order that the water chambers may be filled from the water pan 8 as the train moves along the track, there has been provided a diagonally extending filling pipe 35 having a forwardly curved scoop 36 at its lower end. This scoop is pivotally mounted for swinging movement from raised or inoperative position, as shown in Fig. 6, to the lowered position of Fig. 5, and is connected with a lifting arm 36 by a link 37. Conventional mechanism is employed for operating the lifting arm to raise and lower the scoop and includes an operating valve 38 mounted at the front of the tender, where it may be conveniently reached by an engineman. When the scoop is lowered, it extends into the water pan or trough and, since the tender is moving forwardly, water will pass upwardly through the pipe 35 to the upper end thereof where it is discharged through the forwardly projecting elbow 39 and the discharge spout or nozzle 40. The nozzle 40 is located in the space 15' between plates 42' with plate 17 at its rear and deflecting irons 42 at its sides and extends under the rear slope sheet or plate 41 of fuel space 10 with the plate 22 cut away between plates 42' and back to plate 17 so that water can flow unrestrictedly from the nozzle 40 downwardly and forwardly at an angle parallel to and against the sloping plate or rear wall 41 of the fuel space. Openings 44 are formed through plate 22 for air and water to rise into the sloping section 15' of the expansion chamber and then through the openings 17' of plates 17 into the expansion chamber 15, thereby retarding rise of water in the expansion chamber until the main chambers have been filled the desired high level and providing for the reception of the air to prevent air resistance to the filling of the chambers to such level. The stream of incoming water discharged from the nozzle 40 strikes a divider 43 which is V-shaped in cross section and tapers downwardly as well as forwardly. Since the incoming stream of water is spread by the divider, its force is directed downward and forward so that it will flow into the water chamber or compartment 12 and through the bulkhead openings 19 into side compartments 14 and to the front of tank 13 through forward bulkhead 18 and openings 19 therein. Therefore, damage will not be done to the walls of the tender by the incoming water which is discharged from the nozzle 40 under very high pressure when the tender is traveling at high speed, viz., from 60 to 80 miles per hour or more. The water fills the rear chamber 12, the side chambers 14, and the front chamber 13, and, in order that tests may be made to determine if the water chambers need filling, there have been provided a number of test cocks 45 located at different levels at one side of the front of the tender, where they may be opened by an engineman making the test.

Overflow pipes 46, 47, 48 and 49 are disposed vertically at the sides of the tender and have their upper ends communicating with the water chambers and the expansion chamber and their lower ends passing through the bottom of the tender and terminating in nozzles identified by primed numbers corresponding to the identifying numerals of the pipes. Upper ends of the pipes 46, 48 and 49 have reversed, downwardly extending elbows communicating with the water chambers below their return bends, and upper end portions of the pipes 47 are bent laterally to form vent portions 47a extending at an upward incline toward the center of the expansion tank at its highest level and terminating close to side walls of a channel 50 formed across the top of the expansion chamber, the bottom wall of which forms a walkway, so that trainmen may easily cross the expansion tank when walking along the top of the tender. The nozzles at the lower ends of the pipes extend rearwardly at a downward incline, as shown in Fig. 1, and, referring to Figs. 3 and 4, it will be seen that these nozzles are also deflected to project outwardly at opposite sides of the tender. Therefore, when water flows through the overflow pipes, it will be discharged rearwardly of the tender at a downward incline and outwardly from opposite sides of the tender so that it will be deposited in the gutters 9 at the sides of the track. In view of the fact that the transversely bent upper end of the pipes have syphon-breakers 51 and shields 51' therefor, the water tanks or compartments will not be liable to be emptied. When water overflows from the tender, due to overfilling of the compartments, or surging, it flows downwardly through the pipes and since it is discharged below the tender, and laterally therefrom, into the gutters, formation of ice upon the tender will be prevented, and damaging overflow from the top vents formerly used is eliminated. It should also be noted that air which would normally be trapped in the chamber by inrushing water is discharged through the overflow pipes, thus eliminating back pressure and allowing a greater amount of water to be scooped and eliminating damage to the tank by excessive pressure of air and water. When surging occurs, the water enters the expansion chamber and then flows back into the main water chamber 12 at the back of the tender. In case any water collects upon the top of the rear water chamber, it will drain therefrom through the drain pipes 52 located at rear corners of the tender near the pipes 46. All water discharging from the overflow or vent pipes at their lower ends, arranged below the tank, will be directed into the side gutters, thus preventing damage to the running gear of the tender or to the track bed.

In Figs. 12, 13 and 14, there has been illustrated a modified construction. In this embodiment, certain elements correspond to those previously described and are indicated by the same reference numerals. The overflow pipes 53, 54, 55 and 56 correspond to the pipes 46, 47, 48 and 49, but the reversely bent upper end portions 55' of the pipes 55 are larger than the correspondingly bent upper portions of pipes 48, and the bent upper portions 56' of pipe 56 extend rearwardly of the tender into the side water chamber instead of forwardly and near its upper end the pipe 56 is provided with a vent connection 57 communicating with the top of the front water compartment 13 of the tender. The pipes 53 and 56 each has a diagonally extending outlet spout 58 at its lower end passing through the frame 59 having the nozzle angle within the frame to clear swing of trucks directly below it as illustrated in Fig. 14. The pipes 54 and 55 each have an outwardly bent lateral extension 60 at its lower end from which extends a downwardly inclined spout 61 for discharging water into the gutter. The pedestals 62 are cast integral with the water bottom frame 63 and since the side extensions 60 pass outwardly, as shown in Fig. 13, they will be well supported and braced against strain longitudinally of the tender when a train is in motion.

In Figs. 15 through 18, the tender has its frame 62 formed with side pockets 63' each provided with an inlet 64 at its top and an outlet 65 at the outer side of its lower end. The inlet is surrounded by a flange 66 to which the lower end of the overflow pipe 67 is secured by a welded joint 68 and the outlet is also surrounded by a flange 69 to which the inner end of a downwardly inclined nozzle 70 is secured by a welded joint 71. By using this construction, there will be provided a cast metal water bottom tender frame wherein the casting or frame serves as a part of the overflow pipes.

The present invention has been designed for the purpose of allowing rapid filling of the tender with water when the tender is traveling at high train speeds, in such manner as to reduce waste of water while preventing bulging or disruption of walls or leak-straining of seams of walls or other damage to the tender, its running gear or to the trackway, or damage to a following car or to cars traveling on other tracks and passing the tender while it is being filled by scoop operation, by which the water is being delivered in large volume and under great pressure liable to cause such damage unless the water is properly distributed throughout the water compartments immediately on delivery and unless dangerous pressures from air and excessive water supply are relieved. Excessive supply is particularly likely to happen at the higher speeds of from 60 to 80 or more miles per hour and to cause abnormally high pressures particularly if the pick-up action of the scoop begins when the water compartments are from one-half to two-thirds full, and the apparatus must therefore function to rapidly distribute the water to the compartments and to give highly effective overflow and pressure relief actions in order to prevent damages of the character referred to.

The speed of travel of high speed trains, those traveling at the rate of 45 to 60 miles per hour, and particularly those traveling at the rate of from 60 to 80 miles per hour or higher, as well as the large sized locomotives and tenders employed in high speed trains and the amount of water carried and consumed, make it necessary to use means whereby the tender may be rapidly replenished with water without using a track pan of abnormal length and in order to prevent loss of time so that a high speed schedule may be maintained. The use of a water scoop enables the operation of replenishing the tender to be carried out while a train is traveling and without reduction of speed. To meet service conditions, however, it is necessary also to provide the tender with a top filling inlet whereby it may be replenished with water from a water column at high pressure and in large volume to enable the tender to be quickly filled while standing at water stations. In the operation of filling from either a water column or water scoop, it is desirable or essential to provide means to permit the air pressure to build up sufficiently and without water waste, to effect quick distribution of the water while permitting overflow of excess water when the tank is filled and escape of air at the proper time to allow the tank to be filled to the desired maximum level. In order to secure these results when a scoop is used the top filling opening must be kept sealed against the discharge of air and water and against the forcible opening of its closure means under pressure while the pressure in the region thereof is building up to the desired degree to effect quick distribution of the water.

Prior to and during the stages of development of my invention, in tests conducted for the purpose on the locomotive tenders of a well-known railroad, it was found that at the higher speeds named water began to be discharged from vents in the vertical wall immediately back of the coal space within two or three seconds after the scoop had been dropped into the pan and soon thereafter the water began to spray out from under the cistern cover with evidence of considerable pressure. The top of the tank back of the coal space was soon filled with water which then splashed over the side coping in waves, providing water in sufficient body to account for damages of the kind mentioned. Indeed, at the higher speeds the pressure was so great that the lock of the cistern cover was forced and the cover blown open, to release an on-rushing column of solid water discharging through the filling opening. It was also found that interior damages were caused by surging and excess pressure, and that it was necessary to provide effective air vent and water-overflow means which would operate without syphoning off water when the scoop is raised, but which would discharge overflow water in such manner as to prevent damage to the wheel bearings and other parts of the running gear of the tender and to the track through displacement or the washing out of ballast.

These difficulties and disadvantages have been avoided and overcome by my novel construction and combination of parts for effecting rapid distribution of the water by providing water dividing and air pressure producing means to direct and cause proper distribution of the water to the water spaces of the tender, by the provision of means for sealing the top water inlet while scooping to allow the air pressure to build up and water to fill the tank to the maximum level, and by the provision of means for permitting excess water and air under pressure to escape at the proper time and discharging the excess water without damage to the tender running gear or to the trackway. The divider 43 is provided to check the force of the water flowing from the outlet 40 of the conductor 35 and to divide the stream for distribution to the compartments 13 and 14, whereby the full force of the pressure is prevented from falling on any single wall and distribution of the water is facilitated. The chamber 15 and its extension 15' are provided to receive the air forced upward in compartment 2 as the water rises in the compartment so as to allow the water to rise to the intended maximum level, to build up an air pressure which assists in effecting distribution of the water, and to form an auxiliary reservoir compartment in which excess water may be temporarily received and surging reduced. The gate 29 is provided to normally close the funnel inlet 23 and to seal the same against escape of water and air during scooping and to allow the air pressure to build up for the purpose described. This gate relieves the cover 24 from the severe pressure to which it otherwise would be subjected in scooping and the liability of the cover being forced open. The counterweight keeps the gate normally closed and the gate in effect as a check valve opening under the force of the water when it is taken from a water column but closing against the pressure inside the tank when scooping. The vents in the return bends at the tops of the vents or overflow pipes, which are arranged to allow overflow from the several compartments, are provided to allow escape of air as the water rises and are necessary to prevent the vent pipes, the upper ends of some of which are below the level of the water in the tank when full, from acting as syphons to draw water from the tank after the scoop has been raised. During scooping the pipes allow air and excess water to escape and the excess water is discharged at the lower ends of the pipes at such angles as to prevent damage to the running gear of the tender or to the ballast of the trackway, whereby disturbance or washing away of the ballast is avoided.

By the above described construction and arrangement of parts water scooping at all speeds is permitted, and permitted at very high speeds without damage to tender, trackway, or other cars. The construction described, by the use of the check-valve gate 29, also permits of the use of a top filling inlet, for taking water from a water column, on a tender having a high speed scoop, so as to prevent ordinary waste through the inlet while the scoop is being used or loss of water in large quantity due to the forcing open of the inlet cover and the blowing out of water through the inlet.

Having thus described the invention, what is claimed is:

1. In a locomotive tender, a fuel space in the tender, a water chamber in the tender back of the fuel space having its forward portion extending under the fuel space and divided therefrom by a wall extending forwardly at a downward incline, an expansion chamber back of the fuel space disposed over the rear water chamber and communicating therewith, a top filling inlet for delivering water into the water chamber, a scoop for delivering water into the chamber, a normally automatically closed closure for the filling inlet having closing means and acting as a check valve adapted to open under the weight of the water when it is taken from a water column and to be held closed by its closing means and by the pressure within the water chamber when scooping, and overflow pipes communicating with the water chamber and for discharging air and overflow water therefrom.

2. In a locomotive tender, a fuel space in the tender, a water chamber in the tender disposed back of the fuel space and having portions extending forwardly at opposite sides of the fuel space, a top filling inlet for delivering water into said chamber from a water column, an expansion tank above the water chamber located back of the fuel space and having a forward portion extending under the fuel space and provided with an upper wall extending forwardly at a downward incline, a water scoop including a pipe extending vertically in the water chamber and having a discharge spout at its upper end located in the forward portion of the expansion chamber and curved forwardly and downwardly at an incline, a divider in the water chamber located in front of the discharge spout with a portion extending upwardly into the forward portion of the expansion chamber, a normally closed automatically closed closure for the filling inlet having closing means and acting as a check valve adapted to open under the weight of the water when it is taken from a water column and to be held closed by its closing means and by the pressure within the water chamber when scooping, and overflow pipes communicating with the water chambers and the expansion chamber for discharging air and overflow water therefrom.

3. A locomotive tender having a water chamber, a top filling inlet for delivering water into the chamber from a water column, a scoop for taking up and delivering water into the chamber from a track-pan, and a normally automatically closed closure for the filling inlet acting as a check valve adapted to open under the weight of the water when it is taken from a water column and to be held closed by and against the water pressure within the chamber when scooping.

4. A locomotive tender having a water chamber, a top filling inlet for delivering water into the chamber from a water column, an expansion chamber disposed above the water chamber and communicating therewith, a scoop for taking up and delivering water into the water chamber from a track-pan, and a normally automatically closed closure for the filling inlet acting as a check valve adapted to open under the weight of the water when it is taken from a water column and to be held closed by and against the water pressure within the water chamber when scooping.

5. A locomotive tender having a water chamber, a top filling funnel opening at its lower end into the chamber for delivering water into the chamber from a water column, a scoop for taking up and delivering water into the chamber from a track-pan, and a normally automatically closed closure for the funnel arranged to close upwardly against the lower end of the funnel and to open downwardly into the chamber and acting as a check valve adapted to open under the weight of the water when it is taken from a water column and to be held closed by and against the water pressure within the chamber when scooping.

6. A locomotive tender having a water chamber, a top filling inlet for delivering water into the chamber from a water column, an expansion chamber disposed above the water chamber and communicating therewith, a scoop for taking up and delivering water into the water chamber from a track-pan, overflow pipes communicating at their upper ends with the upper portions of the water and expansion chambers and leading downwardly therefrom and having their lower ends arranged to discharge below the bottom of the tender, and a normally automatically closed closure for the filling inlet acting as a check valve adapted to open under the weight of the water when it is taken from a water column and to be held closed by and against the water pressure within the water chamber when scooping.

7. A locomotive tender having a water chamber, a top filling inlet extending at its lower end into the water chamber for delivering water into the chamber from a water column, a scoop for taking up and delivering water into the chamber from a track-pan, and a normally automatically closed closure for the filling inlet arranged within the water chamber and mounted for upward and downward movements to closed and open positions with relation to the lower end of the inlet and acting as a check valve adapted to open under the weight of the water when it is taken from a water column and to be held closed by and against the pressure in the chamber when scooping.

8. A locomotive tender having a water chamber, a fuel space, and an upwardly and rearwardly inclined slope sheet separating said chamber from said space, an expansion chamber disposed above and communicating with the water chamber and having a contracted forward portion located beneath the upper rear portion of the slope sheet, a top filling inlet for delivering water into the chamber from a water column, a scoop for taking up and delivering water into the water chamber from a track-pan, said scoop having an upper delivery end disposed in the contracted portion of the expansion chamber and facing said upper rear portion of the slope sheet, means for deflecting water discharging from the delivery end of the scoop downwardly into the water chamber, and a normally automatically closed closure for the filling inlet acting as a check valve adapted to open under the weight of the water when it is taken from a water column and to be held closed by and against the pressure within the water chamber when scooping.

9. A locomotive tender having a water chamber, a fuel space arranged in advance of the water chamber, and an upwardly and rearwardly inclined slope sheet separating said chamber from said space, a top filling inlet for delivering water into the chamber from a water column, an expansion chamber located above the water chamber and communicating therewith, a scoop for taking up and delivering water into the water chamber from a track-pan, a normally automatically closed closure for the filling inlet having closing means and acting as a check valve adapted to open under the weight of the water when it is taken from a water column and to be held closed by its closing means and by the pressure within the water chamber when scooping, and overflow means for venting air and water from the water and expansion chambers.

10. A locomotive tender having a water chamber, a top filling inlet for delivering water into the chamber from a water column, a scoop for taking up and delivering water into the chamber from a track-pan, a closure for the filling inlet arranged in the water chamber and mounted to open under the weight of the water when it is taken from a water column, and means for holding the closure normally closed, said closure being exposed to the pressure in the water chamber so as to be held closed by said holding means and the pressure in the chamber when the water is being taken in by scooping.

CARL F. KANTOLA.

REFERENCES CITED

The following references are of record in the file of this patent:

UNITED STATES PATENTS

| Number | Name | Date |
| --- | --- | --- |
| 1,276,880 | Crawford | Aug. 27, 1918 |
| 1,640,037 | Johnson | Aug. 23, 1927 |
| 1,651,280 | Kiesel | Nov. 29, 1927 |
| 1,731,101 | Hicken | Oct. 8, 1929 |
| 1,731,856 | Gresley | Oct. 15, 1929 |
| 1,741,618 | Dudley | Dec. 31, 1929 |
| 1,876,297 | Hoke | Sept. 6, 1932 |

FOREIGN PATENTS

| Number | Country | Date |
| --- | --- | --- |
| 17,053 | England 1903 | May 19, 1904 |